United States Patent
Bengtsson

(10) Patent No.: US 9,722,682 B2
(45) Date of Patent: Aug. 1, 2017

(54) DIVERSITY FOR MIMO SYSTEMS

(71) Applicant: Sony Corporation, Tokyo (JP)

(72) Inventor: Erik Bengtsson, Eslöv (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/602,482

(22) Filed: Jan. 22, 2015

(65) Prior Publication Data

US 2016/0191130 A1 Jun. 30, 2016

Related U.S. Application Data

(63) Continuation of application No. PCT/EP2014/079425, filed on Dec. 30, 2014.

(51) Int. Cl.
*H04B 7/06* (2006.01)
*H04B 7/0413* (2017.01)
(Continued)

(52) U.S. Cl.
CPC ......... *H04B 7/0615* (2013.01); *H04B 7/0413* (2013.01); *H04B 7/0689* (2013.01); *H04B 7/0871* (2013.01); *H04B 7/024* (2013.01); *H04B 7/0608* (2013.01); *H04B 7/0802* (2013.01); *H04B 7/0897* (2013.01)

(58) Field of Classification Search
CPC .. H04B 7/0615; H04B 7/0413; H04B 7/0689; H04B 7/0871; H04B 7/0608; H04B 7/0897; H04B 7/0802; H04B 7/024
See application file for complete search history.

(56) References Cited

U.S. PATENT DOCUMENTS 6,256,506 B1 * 7/2001 Alexander, Jr. ....... G01S 5/0252
342/457
2005/0047485 A1 * 3/2005 Khayrallah .......... H04B 1/7117
375/148
(Continued)

FOREIGN PATENT DOCUMENTS

EP 1361679 A2 11/2003

OTHER PUBLICATIONS

Jungnickel et al., "The Role of Small Cells, Coordinated Multipoint, and Massive MIMO in 5G", IEEE Communications Magazine, IEEE Service Center, Piscataway, US, vol. 52, No. 5, May 1, 2014, pp. 44-51, XP011548492, ISSN: 0163-6804, DOI: 10.1109/MCOM.2014.6815892 [retrieved on May 14, 2014].
(Continued)

*Primary Examiner* — Kenneth Lam
(74) *Attorney, Agent, or Firm* — James C. Edwards; Moore & Van Allen, PLLC

(57) ABSTRACT

The invention is directed to systems, methods and computer program products for determining an operational mode for a device in a network. An exemplary method comprises determining a device has a first antenna and a second antenna; determining a first number of multipath components and associated power levels for the first antenna; determining a second number of multipath components and associated power levels for the second antenna; and determining an operational mode for the device based on the first number of multipath components and its associated power levels for the first antenna and the second number of multipath components and its associated power levels for the second antenna.

18 Claims, 4 Drawing Sheets

(51) Int. Cl.
*H04B 7/024* (2017.01)
*H04B 7/08* (2006.01)

(56) References Cited

U.S. PATENT DOCUMENTS

| | | | | |
|---|---|---|---|---|
| 2005/0047517 | A1* | 3/2005 | Georgios | H04B 7/0417 375/267 |
| 2007/0147251 | A1* | 6/2007 | Monsen | H04B 7/0632 370/235 |
| 2007/0280367 | A1* | 12/2007 | Nakao | H04B 7/043 375/260 |
| 2010/0227567 | A1* | 9/2010 | Dinan | H04B 7/0691 455/69 |
| 2011/0051835 | A1* | 3/2011 | Yuan | H04B 7/024 375/267 |
| 2012/0014279 | A1* | 1/2012 | Miyoshi | H04B 7/0413 370/252 |
| 2013/0322508 | A1* | 12/2013 | Chen | H04B 7/0811 375/227 |
| 2014/0092877 | A1* | 4/2014 | Kazmi | H04W 88/06 370/336 |
| 2014/0184440 | A1* | 7/2014 | Park | H01Q 25/04 342/351 |

OTHER PUBLICATIONS

International Search Report and Written Opinion; Sep. 14, 2015; issued in International Patent Application No. PCT/EP2014/079425.

\* cited by examiner

DIVERSITY FOR MIMO SYSTEMS

BACKGROUND

Antenna diversity refers to using two or more antennas to improve the quality of a wireless link between a base station ("BS") and user equipment ("UE"). When the order (i.e., number of antennas) of a multiple input multiple output ("MIMO") system increases, it may not be as straightforward to select which antenna to use among multiple antennas for optimizing a wireless link or connection between a UE and a BS. The present invention is directed to enabling such a selection.

BRIEF SUMMARY

Embodiments of the invention are directed to systems, methods and computer program products for determining an operational mode for a device in a network. A method for determining an operational mode for a device in a network comprises: determining the device has a first antenna and a second antenna; determining a first number of multipath components and associated power levels for the first antenna; determining a second number of multipath components and associated power levels for the second antenna; determining the operational mode for the device based on the first number and its associated power levels and the second number and its associated power levels.

In some embodiments, the method further comprises determining a first angle of arrival ("AOA") for at least one multipath component of the first antenna; determining a second AOA for at least one multipath component of the second antenna; determining whether to implement the operational mode based on the first AOA and the second AOA.

In some embodiments, the method further comprises determining whether to implement the operational mode for the device based on determining a load on a cell or a sector associated with a base station in communication with the device.

In some embodiments, the method further comprises determining whether to implement the operational mode for the device based on a preference of the device.

In some embodiments, the preference is based on a power level of the device.

In some embodiments, the first number and the second number are determined at a single base station.

In some embodiments, the first number and the second number are determined at multiple base stations.

In some embodiments, the network comprises a massive multiple input multiple output ("MIMO") system.

In some embodiments, the network comprises a coherent MIMO system.

In some embodiments, the method further comprises determining whether to use the first antenna or the second antenna based on the first number and the second number.

In some embodiments, the first number and the second number are based on eigenvalues associated with the first antenna and the second antenna.

In some embodiments, the method further comprises determining whether to use the first antenna and the second antenna to transmit the same pilot signal or different pilot signals.

In some embodiments, the method further comprises determining whether the first number is greater than, substantially equal to, or less than the second number.

In some embodiments, the method further comprises determining the operational mode is performed by the device.

In some embodiments, determining the operational mode is performed by a base station in communication with the device.

In some embodiments, the method further comprises ranking the first antenna and the second antenna based on the first number and the second number.

In some embodiments, the operational mode is dynamically determined by a base station.

In some embodiments, the device comprises more than two antennas.

In some embodiments, an apparatus is provided for determining an operational mode for a device in a network. The apparatus comprises: a memory; a processor; and a module stored in the memory, executable by the processor, and configured to: determine the device has a first antenna and a second antenna; determine a first number of multipath components and associated power levels for the first antenna; determine a second number of multipath components and associated power levels for the second antenna; determine the operational mode for the device based on the first number and its associated power levels and the second number and its associated power levels.

In some embodiments, a computer program product is provided for determining an operational mode for a device in a network. The computer program product comprises a non-transitory computer-readable medium comprising a set of codes for causing a computer to: determine the device has a first antenna and a second antenna; determine a first number of multipath components and associated power levels for the first antenna; determine a second number of multipath components and associated power levels for the second antenna; determine the operational mode for the device based on the first number and its associated power levels and the second number and its associated power levels.

BRIEF DESCRIPTION OF THE DRAWINGS

Figure 1:
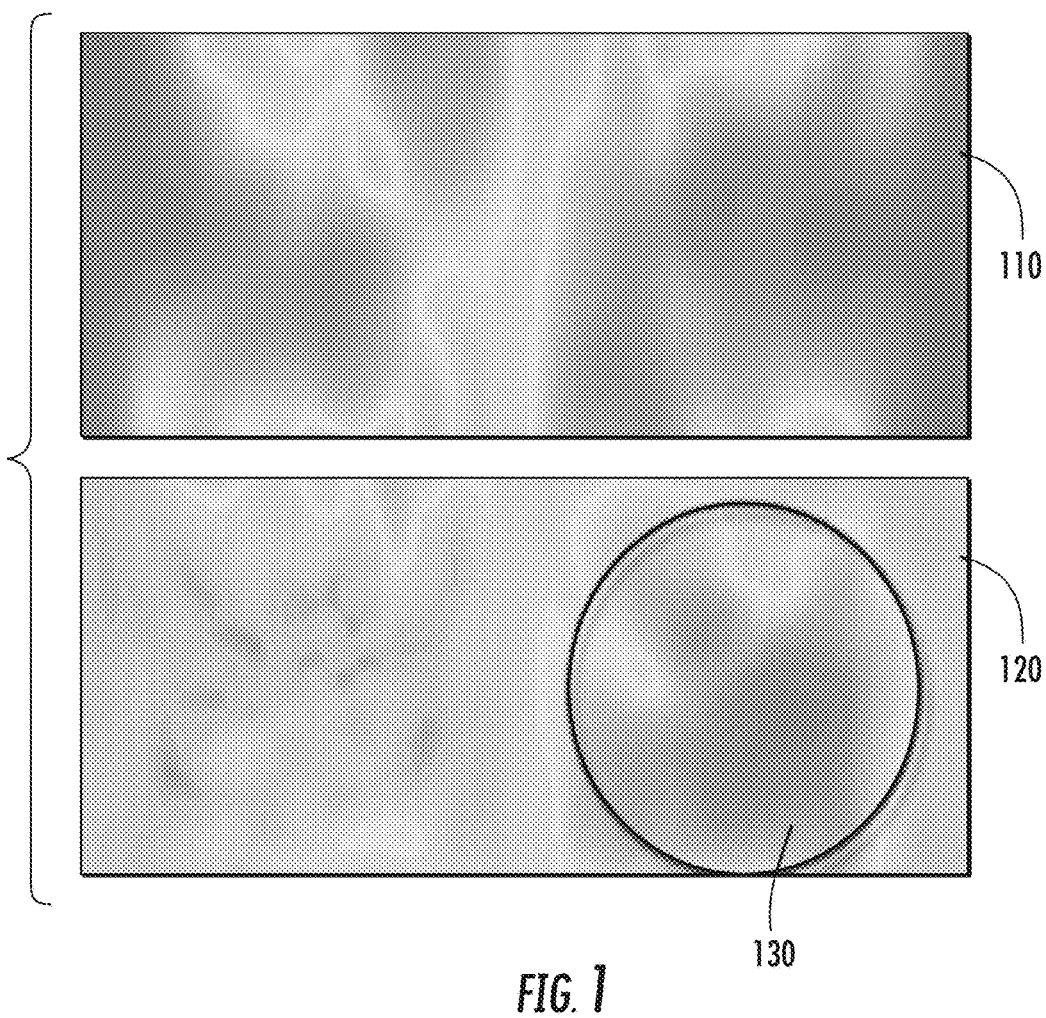
Figure 2:
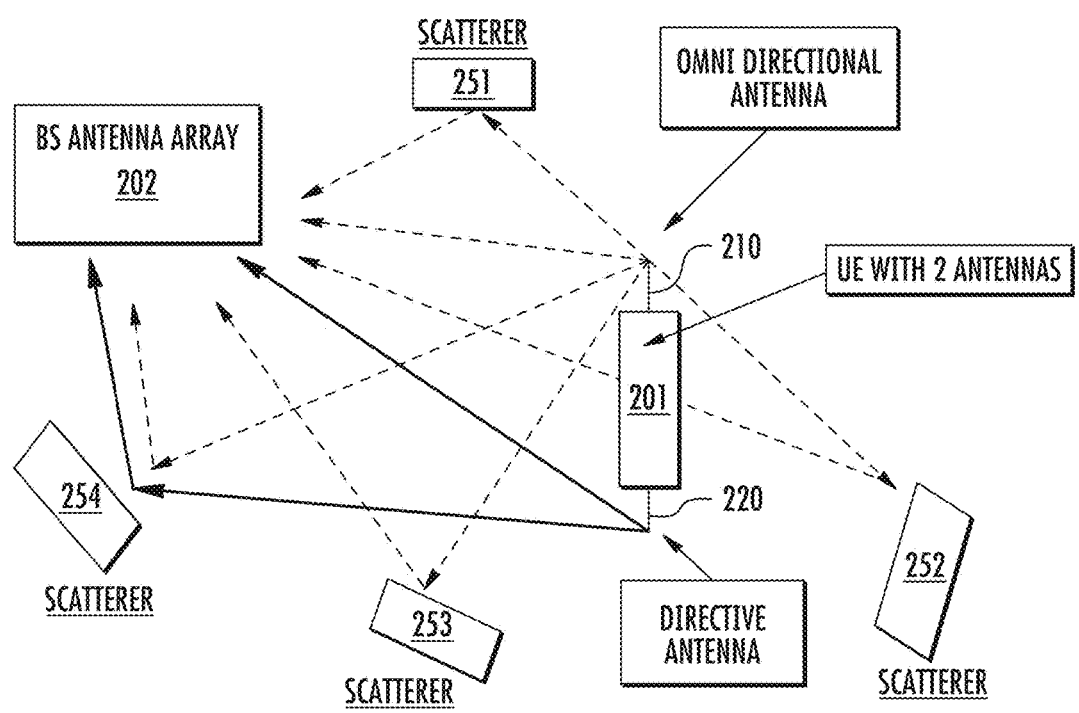
Figure 3:
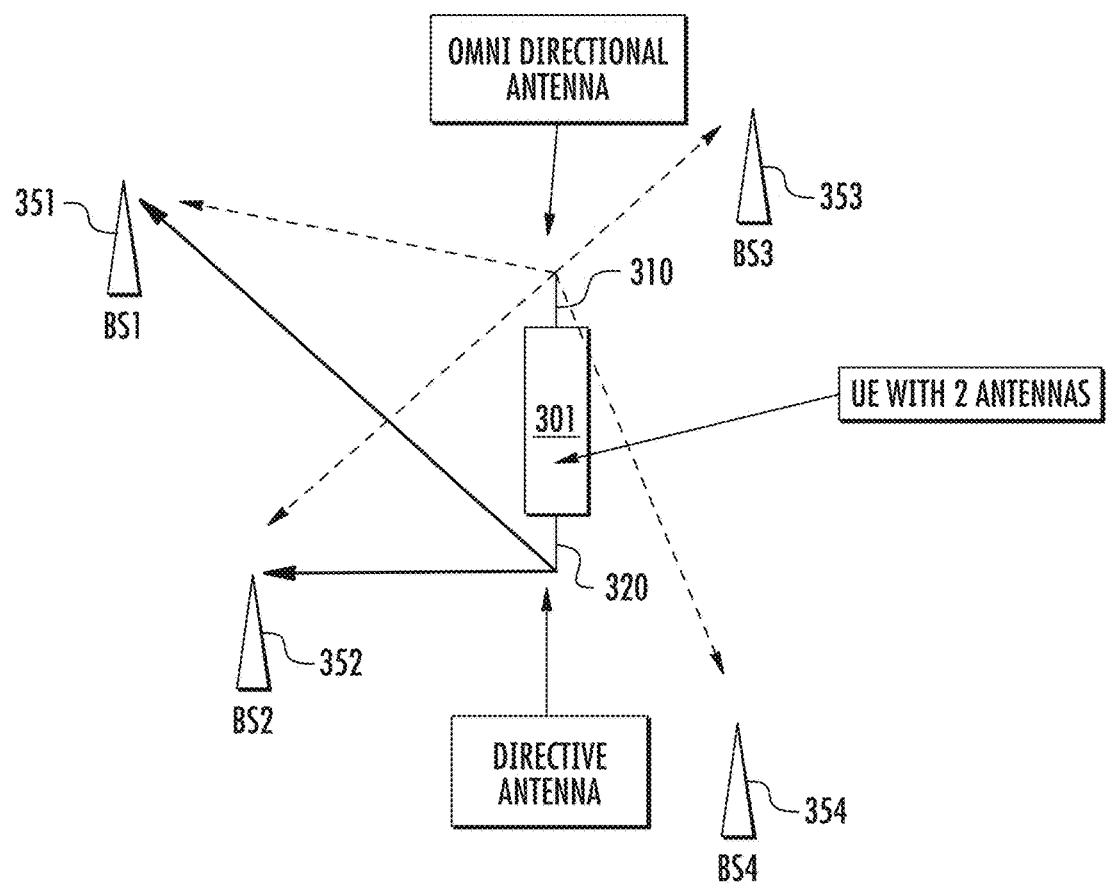
Figure 4:
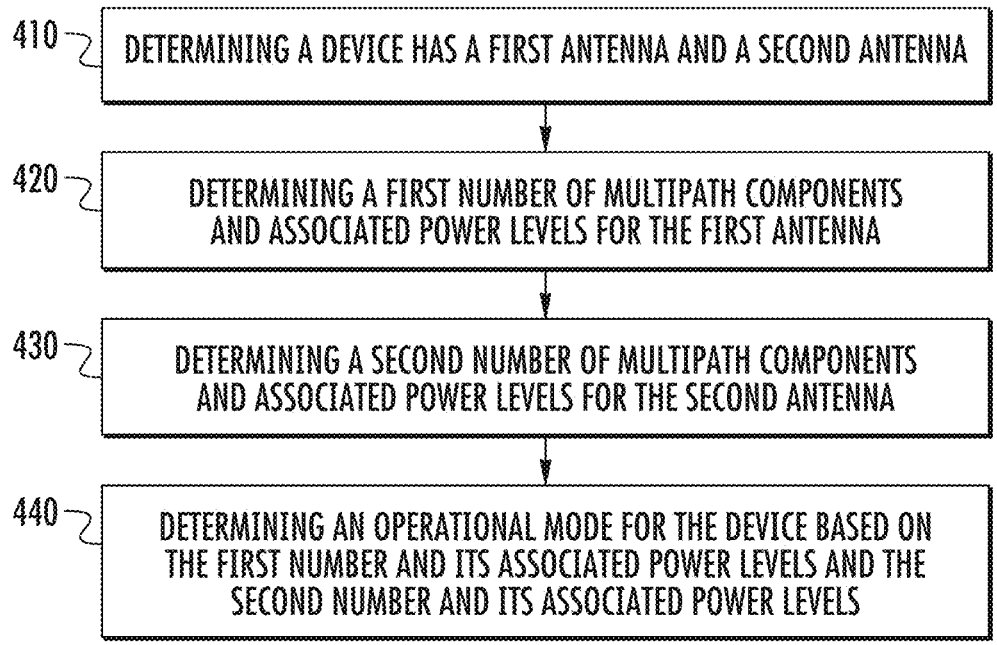

Having thus described embodiments of the invention in general terms, reference will now be made to the accompanying drawings, where:

FIG. 1 shows exemplary antenna patterns, in accordance with embodiments of the present invention;

FIG. 2 is an exemplary network environment, in accordance with embodiments of the present invention;

FIG. 3 is an exemplary network environment, in accordance with embodiments of the present invention;

FIG. 4 is an exemplary method, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Massive MIMO systems are a popular candidate for future 3GPP ($3^{rd}$ Generation Partnership Project) releases.

"Massive" MIMO refers to using multiple antennas (e.g., equal to or greater than a threshold number of antennas) in a MIMO system. An order associated with a MIMO system refers to a number of antennas associated with the MIMO system. The MIMO system includes at least one user equipment ("UE") and at least one base station ("BS"). There is massive research in the area of MIMO systems but UE antenna behavior is overlooked.

Recently, live testing of MuMIMO ("multi-user MIMO") systems has performed worse than expectations. It has been seen that there is larger than expected correlation from the radio channels (also referred to as a wireless link from UEs) to different base stations. This can be explained by the notion that user interaction with the antenna is a dominant contributor to the performance of the antenna. One way to improve the performance is through diversity. Antenna diversity refers to using two or more antennas to improve the quality of a wireless link between the BS and a UE.

In CoMIMO ("coherent MIMO"), MuMIMO, and massive MIMO systems, it may not be as straightforward to select which antenna to use among multiple antennas for establishing a wireless link or connection between a UE and a BS. Hence, the network performance is determined not only by the signal strength to each UE, but also-the channel richness, which is the fundamental principle behind MIMO. As used herein, network performance or performance of a cell or cluster of cells with one or more BSs and one or more UEs refers to at least one of BS performance and/or UE performance. Channel richness refers to an amount of information that can be carried (e.g., per unit time) on the wireless link between the BS and the UE. The amount of information may be represented by the number of multipath components and associated power levels. Each MPC is associated with a power level. A larger MPC may be associated with a higher power level.

The present invention provides multiple modes for the UE. The present invention also incorporates dynamic antenna or antenna mode selection, such that the mode may be changed dynamically based on interaction between the BS and the UE. In some embodiments, the UE includes more than two antennas and this enables higher ranks to be allotted among antenna modes. The number of ranks is either less than or equal to the number of antennas at the UE. For example, if there are N antennas, the BS decides to use a rank between 1 to N based on the performance of each antenna and the load on the cell associated with the BS.

The present invention enables the use of multiple antennas, and enables the use of combinations for the multiple antennas. For example if four antennas are used, they may be operated as two pairs of antennas. For example, each antenna in a first pair of antennas may transmit the same pilot signal, while each antenna in the second pair of antennas may transmit different pilot signals. Based on the ranking scheme described herein, this would provide second rank operation (described below) with four antennas. A combination UE as described herein transmits individual pilots for each antenna periodically, which enables the BS to characterize conditions of the channel to the UE.

There are primarily four modes for a UE with two antennas and the BS may determine which one to use. The selection may be based on a trial and error approach or based on the determination that one mode does not perform to a threshold level of performance, and then the BS decides to try a different mode. A BS may in this context be multiple BSs (in CoMIMO), a massive MIMO BS, or at least one BS that represents a combination of CoMIMO and massive MIMO. As used herein, a training sequence is also referred to as a pilot signal. As described herein, a UE includes a first antenna and a second antenna.

In the first mode, a first antenna is used for communicating with the BS. A single radio frequency ("RF") channel is provided such that an information signal is transmitted from the BS to multiple multipath components ("MPCs") reaching the UE (associated with a first rank). The signals reach the UE coherently. This mode is selected if the first antenna of a UE is better than the second antenna from the perspective of channel richness and/or efficiency of the first antenna. In the second mode, the second antenna (not the first antenna) is used for communicating with the BS. The second mode operates similar to the first mode except that the second antenna is used instead of the first antenna.

In the third mode, a dual antenna diversity operation is implemented in the UE. In this mode, both the first antenna and the second antenna transmit the same training sequence either simultaneously (such that the BS views both antennas as one antenna) or independently (such that the BS can distinguish the first antenna from the second antenna). This feature can be implemented such that the modes alternate according to a scheme. In this mode, both antennas of the UE utilize the MPCs associated with both antennas (or combined RF channels) for increased channel richness. In general, this mode is superior to the single antenna mode and the BS prefers this mode unless the cell associated with the BS has a low load (less than a threshold number of UEs communicating with the BS), in which case the BS lets the UE use the single antenna mode to save power. The BS asks the UE for independent training sequences from the antennas periodically to determine performance of the antennas. These training sequences may be transmitted simultaneously by the antennas.

In the fourth mode, a dual antenna MIMO operation is implemented in the UE. This mode is associated with a second rank. Different RF signals (carrying different information) reach the first and second antennas of the UE. This mode provides the highest data rate and may, for example, be selected by the BS when the load on the cell associated with the BS is less than a threshold load. Both antennas of the UE transmit training sequences continuously so that the BS is capable of determining the separate channels associated with the antennas.

A UE transmits a training sequence from each antenna. For example, the UE transmits a training sequence from the first antenna followed by a training sequence from the second antenna if there is only a single radio channel for transmitting training sequences. The BS receives the training sequence and analyzes the training sequence to determine how many MPCs are present and their respective AOA and power levels. As used herein, a MPC may also be referred to a signal component or signal reflection. When the BS subsequently transmits a signal back to the UE, it transmits signal beams in the direction of the MPCs. The BS phases the signal beams (with individual delays) so that the signal beams reach the UE simultaneously or coherently. This procedure is repeated for every data frame. For the second rank operation as described previously, each antenna is treated as if it were a different UE, and the antennas use the same time and frequency resources except for when the training sequence is transmitted from the UE.

For CoMIMO, the BSs are synchronized such that signals from all BSs reach the UE at substantially the same time, i.e., coherently. The signals will then be added to each other. A CoMIMO system can be seen as a massive MIMO system with distributed antennas instead of a single antenna array where the antennas are near each other. Therefore, the present invention also enables combining CoMIMO with massive MIMO so that each BS transmits multiple MPCs to a UE.

Referring now to FIG. 1, FIG. 1 indicates patterns for an antenna. Pattern 110 refers to a pattern for an antenna in free space. Pattern 120 refers to a pattern for an antenna loaded by hand. The directivity of the antennas often increases when loaded. This leads to the UE not being responsive to signals in all directions, thereby reducing the richness of a radio channel between the BS and the UE. As indicated in pattern 120, most of the radiation 130 is located in a sector of the sphere.

The procedure described herein is a closed loop ("CL") procedure where the BS evaluates the UE's antennas and selects an antenna that has the optimal channel richness associated with the channel between the BS and UE. The present invention provides a closed loop switched diversity procedure for optimizing performance in high order MIMO systems. A closed loop procedure is where one or more feedback loops are present between the output (e.g., the BS or UE) and input (e.g., the UE or BS) of the system.

The present invention enables the BS and/or the UE to test at least two antennas of a UE in a controlled manner to determine which antenna provides better performance. As used herein, performance of an antenna refers to how much data can be transmitted or received (by or at the BS and/or the UE) via the antenna in a certain time interval.

In massive MIMO cases, a BS may evaluate the eigenvectors associated with each antenna of a UE. The eigenvector is a measure of how many MPCs exist in the radio channel (or wireless link) between the UE and the BS. The higher directivity the UE antenna has, the fewer MPCs reach the BS from the UE. An MPC refers to a signal component or signal reflection. As used herein, a MIMO system refers to at least one of a BS or a UE.

Referring now to FIG. 2, FIG. 2 presents an exemplary network environment. A UE 201 has two antennas 210 and 220. The BS 202 in FIG. 2 is a massive MIMO system. FIG. 2 show a case where an omnidirectional antenna 210 generates 5 MPCs while the directional antenna 220 generates 2 MPCs. Additionally, FIG. 2 presents multiple scatterers 251, 252, 253, and 254 that are used to deflect radio signals (or MPCs) from the UE 201 to the BS 202. In the case shown in FIG. 2, the antenna 210 exhibits superior performance compared to the antenna 220 because the antenna 210 emits a radio signal that is associated with more number of MPCs compared to the antenna 220. The total radio frequency (RF) level for the antenna 210 may be substantially similar to the total RF level for the antenna 220, and the BS 202 is capable of determining which antenna exhibits superior performance. Additionally, the UE 201 may not be capable of determining which antenna exhibits superior performance. However, in alternate embodiments, the UE 201 is also capable of determining which antenna exhibits superior performance. As used herein, performance of an antenna refers to how much data can be transmitted or received (by or at the BS 202 and/or the UE 201) via the antenna in a certain time interval.

For CoMIMO systems with multiple BSs, the network needs to evaluate the signal level that reaches each BS. As used herein, a signal level is associated with a number of multipath components and associated power levels. In such a system, the system needs to select antenna whose signal can be detected by the maximum number of BSs. A UE 301 comprises an omnidirectional antenna 310 and a directional antenna 320. As indicated in FIG. 3, the signal from the omnidirectional antenna 310 can be detected by BS1 351, BS2 352, and BS3 353. The signal from the directional antenna 320 can be detected by BS2 352 and BS3 353, but not by the other BSs. Since the antenna 310 can be detected by more BSs compared to antenna 320, the antenna 310 yields superior performance compared to antenna 320.

The present invention also enables a MIMO system to select an operational mode for a UE based on eigenvalues associated with the antennas of the UE. An operational mode may be associated with a rank. For example, a rank (e.g., a first rank) may be based on whether an antenna or combination of antennas is used in a diversity procedure (i.e., the antenna or combination of antennas are used to transmit the same pilot signal substantially simultaneously). A rank (e.g., a second rank) may also be based on whether the individual antennas at the UE transmit individually unique pilot signals (e.g., to the BS). A rank may also be based on a load on each antenna. A load may refer to the amount of data being transmitted and/or received by the antenna per unit time. Alternatively or additionally, the term "load" as described in this specification also refers to the scenario where the antenna performance is degraded because of physical interaction with a user's hand. A higher rank requires greater system resources (e.g., greater amount of memory and/or processing power at the UE). For example, a second rank scenario requires greater amount of system resources for transmitting and/or receiving data compared to a first rank scenario.

As an example, a first antenna of a UE has a load greater than a threshold load, and a second antenna of a UE has a load smaller than the threshold load. In such an example, at least one of the UE and/or the BS determines that the second antenna will deliver higher level of performance, and therefore selects the second antenna for transmitting and/or receiving data.

As another example, a first antenna and a second antenna of a UE indicate substantially equal performance, but the network has users greater than a threshold number of users. In such an example, at least one of the UE and/or the BS determines that dual antenna diversity operation is required, which means that the same pilot is transmitted from both the first antenna and the second antenna substantially simultaneously.

As another example, a BS may not be able to separate (e.g., identify or receive a signal from or transmit a signal to) a first UE from a second UE due to the network environment having a number of UEs greater than a threshold number of UEs. In such an example, at least one of a UE in the network environment and/or the BS determines that dual antenna diversity operation is required for a UE as this improves the UE's performance (e.g., antenna performance) and makes it possible for the BS to separate a first UE from a second UE.

As another example, both antennas of a UE have a load smaller than a threshold load. Additionally, both antennas yield substantially equal performance. In such an example, at least one of the UE and/or the BS determines that the UE's antennas needs to transmit individually unique pilot signals (e.g., to the BS). In some embodiments, if the number of antennas on the UE is greater than a threshold number of antennas, then the UE and/or the BS determines that instead of the UE's antennas transmitting individually unique pilot signals, a diversity operation is executed on the UE's antennas such that the antennas transmit the same pilot signal substantially simultaneously. In some of the examples described herein, the performance of an antenna is determined from the eigenvalue associated with the antenna.

The present invention selects an antenna configuration for a UE and ranks the UE's antennas for performance based on each antenna's directionality. In the massive MIMO case with a single BS (FIG. 2), the ranking is based on eigenvalues associated with each antenna. The eigenvalue of an antenna is indirectly proportional to the antenna directionality and/or antenna performance. In the CoMIMO case (FIG. 3), the antenna's directionality is based on the signal level for a signal from the antenna as detected by multiple BSs.

Referring now to FIG. 4, FIG. 4 presents an exemplary method according to embodiments of the invention. At block 410, the method comprises determining the device has a first antenna and a second antenna. At block 420, the method comprises determining a first number of multipath components and associated power levels for the first antenna. At block 430, the method comprises determining a second number of multipath components and associated power levels for the second antenna. At block 440, the method comprises determining an operational mode (e.g., an antenna configuration) for the device based on the first number and its associated power levels and the second number and its associated power levels. For example, the method comprises determining whether an associated power levels is greater than a threshold power level. The threshold power level may be different for both antennas. In some embodiments, the method further comprises determining a first angle of arrival (AOA) for at least one multipath component of the first antenna; determining a second AOA for at least one multipath component of the second antenna; and determining the operational mode based on the first AOA and the second AOA. In some embodiments, the method further comprises determining whether to use the first antenna or the second antenna based on the first number and the second number. In some embodiments, the multipath components may be substituted by equivalent parameters such as eigenvalues as described herein.

In some embodiments, the first number and the second number are determined at a single base station. In some embodiments, the first number and the second number are determined at multiple base stations. In some embodiments, the first antenna is an omnidirectional antenna. In some embodiments, the second antenna is a directional antenna. In some embodiments, the network comprises a massive multiple input multiple output (MIMO) system. In some embodiments, the network comprises a coherent MIMO system.

In some embodiments, the first number and the second number are determined based on multipath components detected at a single base station. In some embodiments, the first number and the second number are determined based on multipath components detected at multiple base stations. In some embodiments, the first number and the second number are based on eigenvalues associated with the first antenna and the second antenna.

In some embodiments, the method further comprises determining whether to instruct the first antenna and the second antenna to transmit the same pilot signal or different pilot signals. In some embodiments, the method further comprises determining a first load on the first antenna and a second load on the second antenna, and determining whether to implement the operational mode for the device based on the first load and the second load. In some embodiments, the method further comprises determining whether to implement the operational mode for the device based on determining a load on a cell associated with a base station in communication with the device (e.g., determining whether the load is substantially equal to, less than, or greater than a threshold load). In some embodiments, the method further comprises determining whether the first number is greater than, substantially equal to, or less than the second number. In some embodiments, the method further comprises determining whether to implement the operational mode for the device based on a preference (e.g., a power level) of the device.

In some embodiments, determining the operational mode is performed by the device. In some embodiments, determining the operational mode is performed by a base station in communication with the device. In some embodiments, the method further comprises ranking the first antenna and the second antenna based on the first number and the second number.

The invention is not limited to any particular types of devices for the UE and/or BS. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each UE and/or BS comprises a communication interface, a processor, a memory, and a module stored in the memory, executable by the processor, and configured to perform the various processes described herein. Each communication interface described herein enables communication with other systems. For example, the communication interface comprises at least one antenna.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory ("RAM"), a read-only memory ("ROM"), an erasable programmable read-only memory ("EPROM" or "Flash memory"), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining an operational mode for a device in a network, the method comprising:
   determining the device has a first antenna and a second antenna;
   determining a first number of multipath components and associated power levels for the first antenna;
   determining a second number of multipath components and associated power levels for the second antenna;

determining a first angle of arrival (AoA) for at least one multipath component of the first antenna;

determining a second AoA for at least one multipath component of the second antenna;

determining the operational mode for the device based on the first number of multipath components and its associated power levels for the first antenna and the second number of multipath components and its associated power levels for the second antenna;

determining a cell load on a cell associated with a base station in communication with the device, wherein cell load is a number of devices communicating with the base station;

determining that the operational load should be implemented based on the cell load, the first AoA and the second AoA; and implementing the operational mode for the device.

2. The method of claim 1, wherein determining that operational mode should be implemented is further based on a preference of the device.

3. The method of claim 2, wherein the preference is based on a power level of the device.

4. The method of claim 1, wherein the operational mode comprises an antenna configuration.

5. The method of claim 1, wherein the first number of multipath components for the first antenna and the second number of multipath components for the second antenna are determined at a single base station.

6. The method of claim 1, wherein the first number of multipath components for the first antenna and the second number of multipath components for the second antenna are determined at multiple base stations.

7. The method of claim 1, wherein the network comprises a massive multiple input multiple output (MIMO) system.

8. The method of claim 1, wherein the network comprises a coherent MIMO system.

9. The method of claim 1, further comprising determining whether to use the first antenna or the second antenna based on the first number of multipath components for the first antenna and the second number of multipath components for the second antenna.

10. The method of claim 1, wherein the first number of multipath components for the first antenna and the second number of multipath components for the second antenna are based on eigenvalues associated with the first antenna and the second antenna.

11. The method of claim 1, further comprising determining whether to use the first antenna and the second antenna to transmit a same pilot signal or different pilot signals.

12. The method of claim 1, further comprising determining whether the first number of multipath components for the first antenna is greater than, substantially equal to, or less than the second number of multipath components for the second antenna.

13. The method of claim 1, wherein determining the operational mode is performed by the device.

14. The method of claim 1, wherein determining the operational mode is dynamically performed by a base station in communication with the device.

15. The method of claim 1, further comprising ranking the first antenna and the second antenna based on the first number of multipath components for the first antenna and the second number of multipath components for the second antenna.

16. The method of claim 1, wherein the device comprises more than two antennas.

17. An apparatus for determining an operational mode for a device in a network, the apparatus comprising:
   a memory;
   a processor; and
   a module stored in the memory, executable by the processor, and configured to:
      determine the device has a first antenna and a second antenna;
      determine a first number of multipath components and associated power levels for the first antenna;
      determine a second number of multipath components and associated power levels for the second antenna;
      determine a first angle of arrival (AoA) for at least one multipath component of the first antenna;
      determine a second AoA for at least one multipath component of the second antenna;
      determine the operational mode for the device based on the first number of multipath components and its an associated power levels for the first antenna and the second number of multipath components and its associated power levels for the second antenna;
      determine a cell load on a cell associated with a base station in communication with the device, wherein cell load is a number of devices communicating with the base station;
      determine that the operational load should be implemented based on the cell load, the first AoA and the second AoA; and
      implement the operational mode for the device.

18. A computer program product for determining an operational mode for a device in a network, the computer program product comprising:
   a non-transitory computer-readable medium comprising a set of codes for causing a computer to:
      determine the device has a first antenna and a second antenna;
      determine a first number of multipath components and associated power levels for the first antenna;
      determine a second number of multipath components and associated power levels for the second antenna;
      determine a first angle of arrival (AoA) for at least one multipath component of the first antenna;
      determine a second AoA for at least one multipath component of the second antenna;
      determine the operational mode for the device based on the first number of multipath components and its associated power levels for the first antenna and the second number of multipath components and its associated power levels for the second antenna;
      determine a cell load on a cell associated with a base station in communication with the device, wherein cell load is a number of devices communicating with the base station;
      determine that the operational load should be implemented based on the cell load, the first AoA and the second AoA; and
      implement the operational mode for the device.

* * * * *